(12) United States Patent
Morgan et al.

(10) Patent No.: US 10,592,485 B1
(45) Date of Patent: Mar. 17, 2020

(54) PROPERTY-BASED DELETION OF DIGITAL DATA

(71) Applicants: Atlassian Pty Ltd, Sydney (AU); Atlassian, Inc., San Francisco, CA (US)

(72) Inventors: Benjamin Morgan, Brisbane (AU); Oliver Burn, Sydney (AU); Christian Rolf, Sydney (AU); Konstantin Abakumov, Sydney (AU)

(73) Assignees: ATLASSIAN PTY LTD, Sydney, New South Wales (AU); ATLASSIAN, INC., San Francisco, CA (US)

( * ) Notice: Subject to any disclaimer, the term of this patent is extended or adjusted under 35 U.S.C. 154(b) by 0 days.

(21) Appl. No.: 16/363,967

(22) Filed: Mar. 25, 2019

Related U.S. Application Data

(60) Provisional application No. 62/787,069, filed on Dec. 31, 2018.

(51) Int. Cl.
*G06F 16/215* (2019.01)
*G06F 16/23* (2019.01)
*G06F 16/245* (2019.01)
*G06F 16/22* (2019.01)
*G06F 16/16* (2019.01)

(52) U.S. Cl.
CPC .......... *G06F 16/215* (2019.01); *G06F 16/162* (2019.01); *G06F 16/221* (2019.01); *G06F 16/2255* (2019.01); *G06F 16/2379* (2019.01); *G06F 16/245* (2019.01)

(58) Field of Classification Search
CPC .. G06F 16/215; G06F 16/221; G06F 16/2255; G06F 16/2379; G06F 16/245; G06Q 10/10; G06Q 10/101; G06Q 10/103
See application file for complete search history.

(56) References Cited

U.S. PATENT DOCUMENTS

| | | | | |
|---|---|---|---|---|
| 6,061,690 | A * | 5/2000 | Nori | G06F 16/221 |
| 2003/0018719 | A1* | 1/2003 | Ruths | G06F 9/52 |
| | | | | 709/205 |
| 2005/0149555 | A1* | 7/2005 | Wang | G06F 16/284 |
| 2006/0195476 | A1* | 8/2006 | Nori | G06F 16/289 |
| 2009/0164521 | A1* | 6/2009 | Lo | G06F 17/24 |
| 2009/0182763 | A1* | 7/2009 | Hawking | G06F 3/0482 |
| 2015/0082281 | A1* | 3/2015 | Koenig | G06F 11/3668 |
| | | | | 717/124 |
| 2017/0116257 | A1* | 4/2017 | Kapoor | G06F 16/951 |

(Continued)

*Primary Examiner* — David T. Brooks
(74) *Attorney, Agent, or Firm* — Hickman Palermo Becker Bingham LLP

(57) ABSTRACT

In one embodiment, a computer-implemented method comprises receiving, from a second computing device at a first computing device that is communicatively coupled to the second computing device, a request to store a first entity data object, the first entity data object including a first property key-value pair; using the first computing device, storing the first entity data object in one or more digital data repositories in response to the request; receiving, from the second computing device at the first computing device, a delete command that specifies the first property key-value pair to delete by; in response to the delete command that specifies the first property key-value pair to delete by, deleting the first entity data object in the one or more digital data repositories.

17 Claims, 3 Drawing Sheets

(56) References Cited

U.S. PATENT DOCUMENTS

| | | | | |
|---|---|---|---|---|
| 2017/0289247 A1* | 10/2017 | Hoarau | ................... | H04L 67/42 |
| 2017/0300553 A1* | 10/2017 | Keene | ................... | H04L 9/0891 |
| 2018/0225314 A1* | 8/2018 | Devarao | ............... | G06F 16/212 |
| 2018/0336723 A1* | 11/2018 | Elmer | ..................... | G06T 17/20 |
| 2019/0042606 A1* | 2/2019 | Griffith | ................ | G06F 16/213 |

* cited by examiner

PROPERTY-BASED DELETION OF DIGITAL DATA

BENEFIT CLAIM

This application claims the benefit under 35 U.S.C. § 119(e) of provisional application 62/787,069, filed Dec. 31, 2018, the entire contents of which are hereby incorporated by reference for all purposes as if fully set forth herein.

TECHNICAL FIELD

One technical field is computer-implemented systems and methods for managing integration and data storage of cloud-based collaboration platforms. Another technical field is computer-implemented methods of deleting data.

BACKGROUND

The approaches described in this section are approaches that are known to the inventors and could be pursued. They are not necessarily approaches that have been pursued. Therefore, unless otherwise indicated, it should not be assumed that any of the approaches described in this section qualify as prior art merely by virtue of their inclusion in this section, or that those approaches are known to a person of ordinary skill in the art.

Computer-implemented business collaboration platforms are now available that integrate functions such as chat rooms, document storage, document sharing, issue tracking, and code management. These platforms can be deployed independently or as part of a federated system that includes collaborative document editing, media sharing, code management and issue tracking. A commercially available example is BRA issue tracking system, available from Atlassian Pty Ltd., Sydney, Australia, alone or in conjunction with the CONFLUENCE document management system and/or BITBUCKET program source code repository.

In order to increase functionality, collaboration platforms can be integrated with other systems or services by the use of integrations (also referred to as plug-ins or add-ons). Integrations may operate to allow users to perform various actions directly from the collaboration platform—e.g. actions associated with the underlying applications services.

Integrating systems requires sharing data and storing integration data from other systems. Integrations function by one collaboration platform communicating with another collaboration platform, i.e. a first collaboration platform tells the second collaboration platform what data to store and what data to delete. Because each collaboration platform may manage accounts differently such as using different groupings for users, teams, and organizations, integrations between two collaboration platforms are custom built by developers to be able to effectively function by storing and deleting integration data relating to different account groupings for each platform.

Techniques are desired for allowing collaboration platforms to flexibly define their own account management structure while also allowing them to easily integrate with other collaboration platforms.

SUMMARY

The appended claims may serve as a summary of the invention.

DETAILED DESCRIPTION

Figure 1:
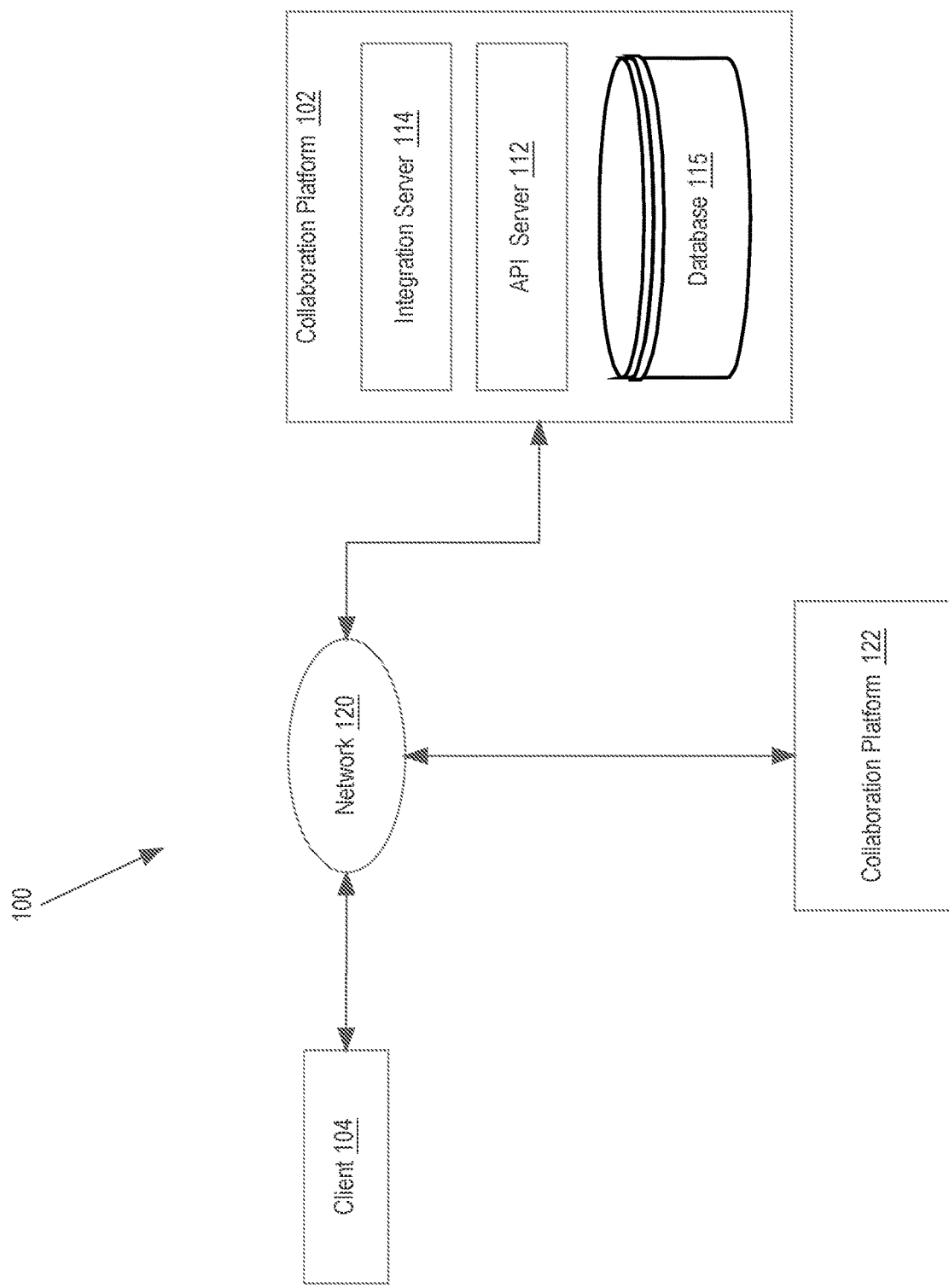
FIG. 1 illustrates an example computer system in which the techniques described herein may be practiced, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
 1. OVERVIEW
 2. EXAMPLE COMPUTER SYSTEM IMPLEMENTATION
 3. EXAMPLE FUNCTIONAL IMPLEMENTATION
 4. HARDWARE OVERVIEW
 5. EXTENSIONS AND ALTERNATIVES

1. Overview

Computer-implemented techniques are provided for property-based deletion. In one embodiment, a first computing device receives from a second computing device that is communicatively coupled to the first computing device, a request to store a first entity data object, the first entity data object including a first property key-value pair. Using the first computing device, the first entity data object is stored in one or more digital data repositories in response to the request. A delete command that specifies the first property key-value pair to delete by is received from the second computing device at the first computing device. In response to the delete command that specifies the first property key-value pair to delete by, the first entity data object is deleted in the one or more digital data repositories.

In another embodiment, a multi-column table comprising an array type column that is structured as a variable length array is created and stored in one or more digital data storage repositories. Multiple sets of digital key-value pairs of properties of different data objects that are associated with different entities are received from a plurality of different computing devices, each of the different computing devices being associated with a different entity among multiple entities, each of the sets comprising at least a first property key-value pair and a second property key-value pair. For a particular set of digital key-value pairs of properties, the first property key-value pair and second property key-value pair are stored as separate elements in the array type column. A delete command is received that specifies the first property key-value pair of the particular set of digital key-value pairs of properties to delete by. In response to the delete command, a particular entity of the multiple entities associated the first property key-value pair of particular set of digital key-value pairs of properties is deleted in the one or more digital data repositories.

Property based storage and deletion techniques discussed herein provide enhanced scalability of integrating collaboration platforms. Additionally, techniques discussed herein provide collaboration platform vendors flexibility to define properties as they see fit while allowing them to seamlessly integrate with other collaboration platforms. Vendors do not need to analyze, consider, or modify how they manage or organize accounts for their platforms. Instead, vendors can treat their account management as properties conforming to key:value pairs and store these properties in an integration data store when integrating with another platform. When it comes time to delete integration data, vendors can specify key:value pairs of properties to delete by to efficiently clean up all data associated with the respective property. Other embodiments, aspects and features will become apparent from the disclosure as a whole.

2. Example Computer System Implementation

FIG. 1 illustrates an example integration network 100 in which aspects of the present disclosure may be implemented.

One specific example of a collaboration platform 102 is described below. The following description describes embodiments and features with respect to this particular example, but alternative collaboration platforms may be used. For example, the functions provided by the API server 112, integration server 114, and database 115 may be provided by a single application (or software suite) running on a single physical computing device, a single application (or software suite) running on multiple physical computing devices, multiple applications running on a single physical computing device, or multiple applications running on multiple physical computing devices. Accordingly, where processing is described as being performed by a particular component of the example collaboration platform 102 it could equally be described (and should be read as describing) processing being performed by the collaboration platform 102.

The integration network 100 includes a collaboration platform 102 in communication with a client, and a collaboration platform 122. While only one client and two collaboration platforms 102, 122 are depicted in FIG. 1, it will be appreciated that in an actual implementation the collaboration platforms 102, 122 can support more clients than just client 104.

The collaboration platforms 102, 122, and client 104 communicate with each other directly or indirectly through one or more communications networks 120. For example, the client 104 may communicate with the collaboration platform 102 through a local area network (LAN) of an enterprise in one embodiment. In this case the collaboration platform 102 may be implemented as an on-premises solution in which the collaboration platform 102 and client 104 are associated with the same business enterprise. In another embodiment, network 120 may represent a public internetwork and the collaboration platform 102 may be located off-premises with respect to an organization, such as in a shared data center or cloud computing facility.

Each client 104 is a software application that accesses a collaboration server application made available by the collaboration platforms 102, 122. Client 104 is hosted on client computing device. Client computing device may be any suitable device, for example a mobile device (e.g. a tablet or mobile phone), a portable device (such as laptop computer), or any other computing device (e.g. a desktop computer). A client 104 includes instructions and data stored in the memory (e.g. non-transient compute readable media) of the computing device on which the client is installed/run. These instructions are executed by the processor of the computing device to perform various functions as described herein.

A client 104 may be implemented in various ways. For example, a client 104 may be web browser application (such as, for example, Chrome, Safari, Internet Explorer, Opera) which accesses the collaboration platforms 102, 122 via an appropriate uniform resource locator (URL) and communicates with the collaboration platforms 102, 122 via general world-wide-web protocols (e.g. HTTP, HTTPS, FTP). A client 104 may be a specific application programmed to communicate with the collaboration platforms 102, 122 using defined application programming interface (API) calls.

Collaboration platform 102 can be integrated with another collaboration platform 122. Generally speaking, an integration may provide a mechanism for a first collaboration platform 102 to communicate information directly to another collaboration platform 122 and allows users of each platform to perform one or more functions offered by the integrated platform. An integration may facilitate integration with any desired system or application, for example a stock exchange system, a weather bureau system, application building software, a service desk system, a file management system, etc.

In an example, an integration may integrate an issue tracking system (such as JIRA, commercially available from Atlassian Pty Ltd) with a code repository system (such as BITBUCKET, commercially available from Atlassian Pty Ltd). In this case, the integration may allow the issue tracking system to post events/information (e.g. new issues being logged, issue status changing etc.) directly to the code repository system. The integration may also (or alternatively) allow a user of a code repository system to view and edit tickets or issues inside the source repository system, link code and commits to tickets, comment on tickets with commit messages and much more.

In an embodiment, a code repository system hosts computer program source code organized, for example, as files and projects. The code repository system may implement version control, commenting, build automation for creating executables, storage of artifacts and ancillary items such as licenses, and other functions. An issue tracking system supports creating issues or tickets with description fields that can identify projects, files or segments of program source code for which an issue has been identified. For example, an issue or ticket can comprise a bug report that identifies parts of source code that have bugs.

Integrations function by one collaboration platform communicating with another collaboration platform. For example, a first collaboration platform, such as collaboration platform 122, communicates what integration data to store and what integration data to delete to the second collaboration platform, such as collaboration platform 102. Integrated platforms do not necessarily share or synchronize integration data relating to account management on each integrated platform, i.e. a 'user' type in BITBUCKET is not necessarily recognized as a 'user' type in JIRA. For example, BITBUCKET has 'users' and JIRA has 'users', but the users from each platform, even if they are the same users, are not linked by the integration. Thus, for an integration of BITBUCKET and JIRA, if a user is deleted in BITBUCKET, BITBUCKET communicates to JIRA which pieces of integration data are related to that user and should be deleted in order to clean up integration data posted in JIRA relating to that user.

The collaboration platforms 102, 122 are configured to deliver integrations and associated functionality to the client 104. To that end, a collaboration platform 102 includes an application programming interface (API) server 112 and an integration server 114. In addition to these servers, the platform 102 may also include application programs, libraries, APIs or other software elements that implement the features and functions that are further described herein. For instance, the collaboration platform 102 may include a database 115 for storing information about integrations.

The API server 112 is configured to provide an interface between the client 104 and the collaboration platform 102 and between a first collaboration platform 102 and second collaboration platform 122. Specifically, the API server 112 allows the clients and content providers to communicate with the collaboration platform over open web protocols such as (HTTPS, REST, and JWT). In some aspects the API server 112 receives update, installation or uninstallation requests from clients 104 and receives integration information and requests from collaboration platform 122. The API server 112 is configured to forward these requests and information to the integration server 114. In one embodiment, the API server 112 is based on the Representational State Transfer (REST) architectural style. Alternatively, it may be based on the Simple Object Access Protocol (SOAP) architecture.

The integration server 114 is configured to receive data or requests from the API server 112 and respond to these requests by taking the appropriate actions. For example, a collaboration platform such as BITBUCKET may be integrated with a collaboration platform such as JIRA. A code repository may be owned by an account in BITBUCKET. When the integration of BITBUCKET and JIRA is configured on BITBUCKET, a user may select the account to have its data integrated with JIRA. BITBUCKET will send data relating to the account to JIRA via API for all selected actions related to the account. When the account is removed from the integration on BITBUCKET, all data for this account must be cleaned up and removed from JIRA.

To facilitate integrations, the integration server 114 is configured to store integration data in the database 115. Integration data, as referred to herein, is any data that relates to the integration of collaboration platforms. In an embodiment, integration server may include a data management layer which may include instructions to perform functions that manage read operations and write operations involving the database 115 and other functional elements of the system, including queries and result sets communicated between the functional elements of the system and the database 115. As used herein, the term "database" may refer to either a body of data, a relational database management system (RDBMS), or to both. As used herein, a database may comprise any collection of data including hierarchical databases, relational databases, flat file databases, object-oriented databases, object oriented databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

In certain embodiments, database 115 stores integration data in an integration data structure. The integration data structure may comprise a multi-column table which stores entity data.

TABLE 1

EXAMPLE ENTITY DATA

| Name | Type | Details |
|---|---|---|
| id | long | Identifier assigned by the database on initial submission |
| cloudId | string | The tenant's cloud identifier associated with the data |
| vendorId | string | The provider identifier associated with the data |
| entityId | string | The identifier for the entity, assigned by the provider. Must be unique within 'cloudId' and 'providerId' |
| issueIds | long[ ] | The issue IDs from the issue keys sent by the provider, max size 100 (DDPS maps to this from Provider-given issue keys) |
| createdAt | timestamp | When the data was first persisted in the DB |
| receivedAt | timestamp | Time the entity was received by the REST resource |
| storedAt | timestamp | When the update was written to the DB (storedAt-receivedAt gives processing time) |
| updateCount | long | The number of times we've updated this entity |
| dataSequenceNumber | long | A sequence number used to optionally manage updates. If an update is received with an earlier number, the update is discarded. |
| dataType | string | Identifier of the data type. Examples include: Feature-flag repository commit build-status etc. |
| data | json | The actual data to be stored. |
| properties | string[ ] | SHA1 hashes of the key/value combinations of the properties sent by the provider, max size 5 |

TABLE 1 represents example integration data associated with an entity. In an embodiment, an entity is a data object associated with the integration of a first collaboration platform and a second collaboration platform. As shown in TABLE 1, an entity data object may include a plurality of attributes, such as Id, cloudId, dataType, and properties. An example entity dataType is a commit. A commit, or "revision", is an individual change to a file or set of files. Every time a file is saved with changes, a unique ID (i.e. a "SHA" or "hash") is created that keeps record of what changes were made, when they were made, and by who. Commits may contain a commit message which is a brief description of what changes were made to a file.

Continuing the example, a commit may be submitted by a user of a first collaboration platform such as BITBUCKET code repository system. The first collaboration platform may be integrated with a second collaboration platform such as JIRA issue tracking system. When a user submits a commit on the first collaboration platform, the integration causes the commit to be saved in database 115 and is reflected on the second collaboration platform.

While example data structures have been provided, it will be appreciated that alternative data structures could be used which include additional, fewer, or alternative fields. Moreover, the data stored by the example data structures may be stored across additional or fewer linked data structures (e.g. a relational database) or, indeed, in a single data structure (e.g. a single table).

In an embodiment, an entity data object includes a properties attribute. Properties may be stored as key:value pairs. In context of an integration of two or more collaboration platforms, properties for different entities can vary as each collaboration platform vendor may manage accounts differently such as using distinct groupings for users and teams. A 'vendor' as referred to herein refers to an organization that develops software for an end user. An example of a collaboration platform vendor may include Atlassian Pty Ltd., Sydney, Australia who develops collaboration platforms such as JIRA and BITBUCKET. Grouping, teams, users and other properties that define data that may vary between different collaboration platforms can be stored as key:value pairs as part of integration data stored in a database such as database 115.

In an embodiment, properties are stored in the integration database 115 by hashing the key and value of a key value pair. Hashing supports arbitrary length properties and provides enhanced security in a property-based API. During submission, query, or deletion, query parameters relating to properties can be hashed and compared to the stored property data.

TABLE 2 shows one example of a multi-column table is stored in database 115.

TABLE 2

EXAMPLE MULTI-COLUMN TABLE

| Id | VendorID | DataType | Properties[ ] |
|---|---|---|---|
| 1 | 700 | commit | team:1234 project:960 subgroup:864 |
| 2 | 800 | commit | organization:devOps2 implementation:543 |

TABLE 2 represents an example of a multi-column table that stores entity data objects. As shown in TABLE 2, each row of the table stores values for a single entity data object. Each column stores values for an attribute of entity data objects. Specifically, the 'Properties[ ]' column is defined as variable-length array type column and stores a key:value pair value for each element in an array for each respective entity data object. For example, the first row of TABLE 2 includes values: '1', '700', 'commit', and '[team:1234], [project:960], [subgroup:864]' for attributes: 'Id', 'VendorID', 'DataType', and 'Properties[ ]', respectively.

As an example of the creation of TABLE 2, a first vendor such as Atlassian Pty Ltd. may use a collaboration platform such as BITBUCKET to integrate with a collaboration platform such as JIRA, which maintains an integration database, such as database 115, which includes a multi-column table such as TABLE 2 for storing entity data objects. Additionally, a second vendor such as GitHub Inc. may use a collaboration platform such as GITHUB to integrate with JIRA. When BITBUCKET stores a commit in the integration database as part of the integration with JIRA, a first entity data object is stored in TABLE 2. When GITHUB stores a commit as part of the integration with JIRA, a second entity data object is stored in TABLE 2. In this example, the first entity data object corresponds to the row of TABLE 2 with Id=1, and the second entity data object corresponds to the row of TABLE 2 with Id=2. VendorID=700 corresponds to the vendor Atlassian Pty Ltd., while VendorId=800 corresponds to GitHub Inc.

Each entity data object stored in TABLE 2 includes multiple distinct properties represented by key:value pairs that are stored as individual elements in the 'Properties[ ]' array type column. For example, the first entity data object includes property key:value pairs: 'team:1234', 'project:960', 'subgroup:864' stored as separate array elements while the second entity data object includes property key:value pairs: 'organization:devOps2', 'implementation:543' stored as separate array elements.

Continuing the above example, if a user is removed from a BITBUCKET team on the BITBUCKET platform, BITBUCKET must communicate to JIRA to delete all information stored in JIRA that is related to the team. Likewise, if a user is removed from a GITHUB organization on the GITHUB platform, GITHUB must communicate to JIRA to delete all information stored in JIRA that is related to the user as part of the integration.

In an embodiment, the deleting operations described in the preceding paragraph, for example, may execute using property-based deletion instructions that are programmed as part of a collaboration platform, its servers or other programs. In an embodiment, property-based deletion is programmed to allow an API call to specify properties to delete an entity entry by. For example, if an integration database includes a plurality of commit entities that include the property 'team:1234' as shown in TABLE 2, an API call can specify to delete all entities with properties 'team:1234'. In another example, if an integration database includes a plurality of commit entities that include the property 'organization:devOps2', as shown in TABLE 2, an API call can specify to delete all entities with properties 'organization:devOps2'.

TABLE 3 shows an example of how data is posted to an integration database. The posted data includes properties with key:value pairs.

TABLE 3

POSTING DATA

```
{
    "cloudId": "cloud-123", "providerId":
"provider-456", "properties": {
        "key1": "value1",
        "key2": "value2"
    },
    "standaloneEntries" : [{ "entityId":
"entity-789",
        "sequenceNumber":
666,
        "dataType": "feature-flag",
    "issueIds": [1,2,3], "data": {
        "unique": "data"
        }
    }]
}
```

TABLE 4 shows an example of how data is deleted from an integration database. The request specifies properties such as "key1": "value1" and "key2": "value2" to delete by.

TABLE 4

DELETING DATA

```
{
    "cloudId": "cloud-123",
    "vendorId" : "vendor-456",
    "properties": {
        "key1": "value1",
        "key2": "value2"
    }
}
```

In another example, TABLE 5 shows a post request that includes properties.

TABLE 5

POST REQUEST

```
sample request Posted to /rest/featureflags/0.1/bulk
{
    "properties": {
        "accountId": "foop123",
        "projectId": "blarp-456"
    },
    "flags": [
        {
        // details of a flag are not shown
        }
    ]
}
```

The corresponding delete request specifies properties such as "foop123" to delete by. The form of a delete request may be:

```
DELETE rest/featureflags/1.0/bulkByProperties?accountId=foop123
```

3. Example Functional Implementation

Figure 2:
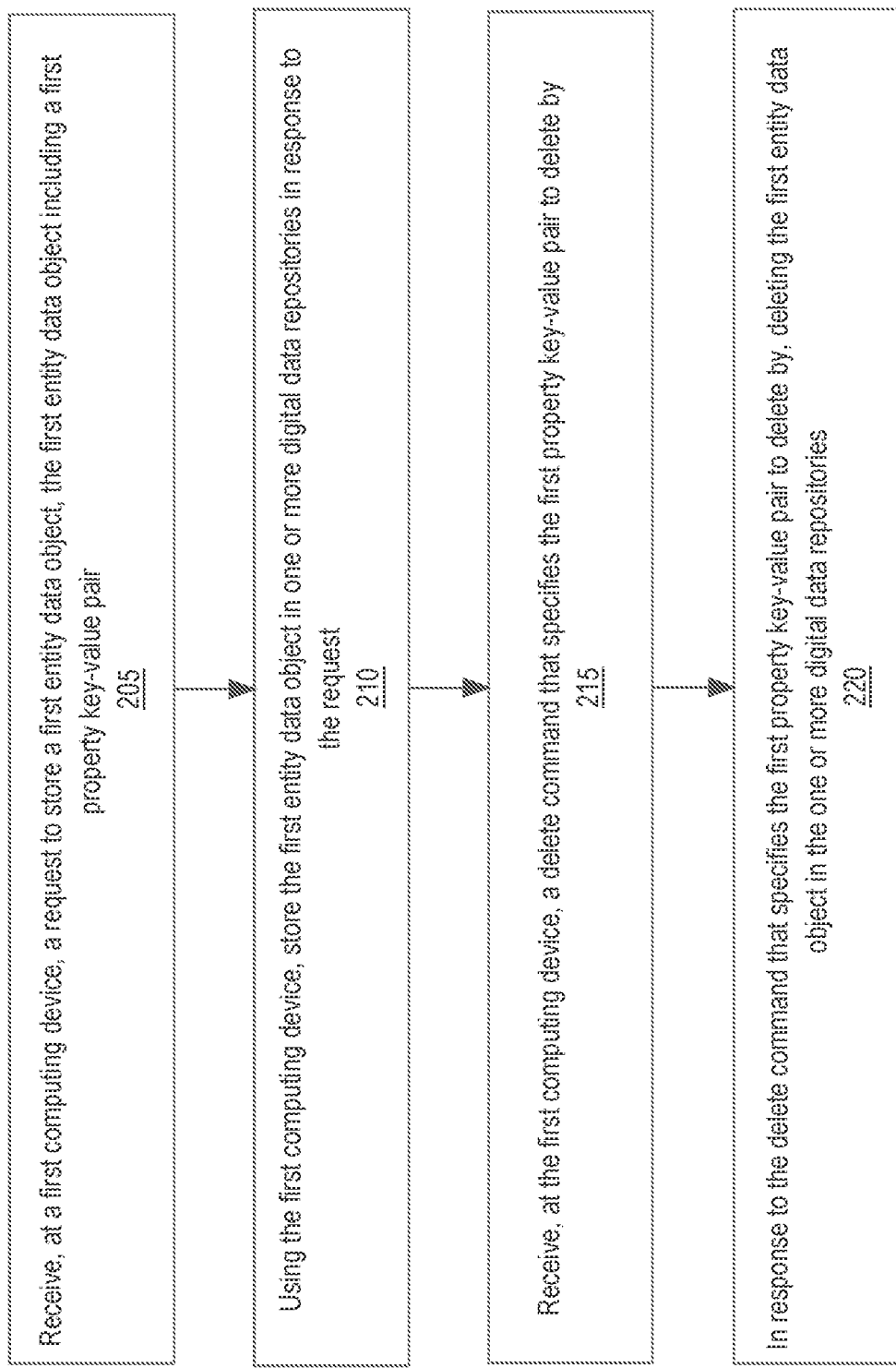
FIG. 2 illustrates a programmable algorithm or method for property-based deletion in accordance with an embodiment.

FIG. 2 illustrates an example programmable algorithm or method for property-based deletion. Although the steps in FIG. 2 are shown in an order, the steps of FIG. 2 may be performed in any order, and are not limited to the order shown in FIG. 2. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

In step 205, receive, at a first computing device, a request to store a first entity data object, the first entity data object including a first property key-value pair. The first entity data object may also include a second property key-value pair or any number of property key-value pairs. The request may be received from a second computing device that is communicatively coupled to the first computing device. For example, collaboration platform 102 receives a request from collaboration platform 122 via network to store the first entity data object in database 115.

In an embodiment, the first comping device comprises a first collaboration platform and the second computing device comprises a second collaboration platform. The first collaboration platform may comprise an issue tracking system or code repository system. The second collaboration platform may comprise an issue tracking system or code repository system.

In step 210, store the first entity data object in one or more digital data repositories in response to the request received in step 205. The first computing device may be used to store the first entity data object in the one or more digital data repositories. The first entity data object may be stored in a multi-column table in the one or more digital data repositories. The first property key-value pair and any additional property key-value pairs may be stored as separate elements in an array type column of the stored in the one or more digital data repositories. The array type column may be defined as a variable-length array. For example, collaboration platform 102 stores the first entity data object in database 115 in a multi-column table such as TABLE 2 discussed above.

In step 215, receive, at the first computing device, a delete command that specifies the first property key-value pair to delete by. The delete command may be received from the second computing device. For example, collaboration platform 102 receives a delete command from collaboration platform 122 via network 120. The delete command may conform to any defined API or open web protocols such as HTTPS, REST, and JWT.

In an embodiment, the delete command is a Structured Query Language (SQL) delete command.

In step 220, in response to the delete command that specifies the first property key-value pair to delete by, deleting the first entity data object in the one or more digital data repositories. For example, collaboration platform 102 uses property-based deletion instructions that are programmed to allow an API call to specify properties to delete an entity data object by to delete the first entity data object from the database 115.

In an embodiment, when an entity data object including a property key-value pair is received by a collaboration platform, a hash value is generated for the property key-value pair and stored in place of the property key-value pair. When a submission, query, or deletion request is received by the collaboration platform that specifies a particular key-value pair, a hash is generated for the particular property key-value pair included in the request and compared to stored hash values of property key-value pairs. In response to determining that the hash value of the particular property key-value pair that was included in the request matches a stored hash value, such as the stored hash value of the property key-value pair, the collaboration platform executes an operation specified by the request such as deletion or returning requested data. This embodiment provides a layer of security when storing properties from multiple vendors and/or integrations. By hashing properties as they are stored in an integration database, anyone with access to the integration database is prevented from viewing and tampering with sensitive organizational data that is stored as properties.

It will be apparent from the disclosure as a whole that embodiments are directed to the practical application of efficient deletion of data in federated computer systems. Normally, integration databases and/or architectures of integration platforms require customization for each new vendor or collaboration platform to support different types of account management groupings provided by each vendor or collaboration platform. Property based storage and deletion techniques discussed herein provide the opportunity to easily scale to new vendors and collaboration platforms without providing a custom implementation for each new vendor or collaboration platform, resulting in storage and memory savings compared to traditional architectures where additional table columns are created for each property.

Additionally, property-based deletion techniques discussed herein provide collaboration platform vendors flexibility to define properties as they see fit while still being able to integrate with other platforms. Vendors do not need to analyze, consider, or modify how they manage or organize accounts for their platforms. Instead, vendors can treat their account management as properties conforming to key:value pairs and store these properties in an integration data store when integrating with another platform. When it comes time to delete integration data, vendors can specify key:value pairs of properties to delete by to efficiently clean up all data associated with the respective property. In this way, embodiments are integrated into the practical application of efficient data deletion in a manner that requires fewer commands, fewer roundtrips of networked messages to accomplish a desired deletion result, and less transient consumption of memory or other storage resources to store commands, intermediate data or intermediate results that would be required using other deletion techniques.

4. Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, meters, sensors, and any other electronic device that incorporates hard-wired and/or program logic to implement the described techniques, one or more virtual computing machines or instances in a data center, and/or a network of server computers and/or personal computers.

Figure 3:
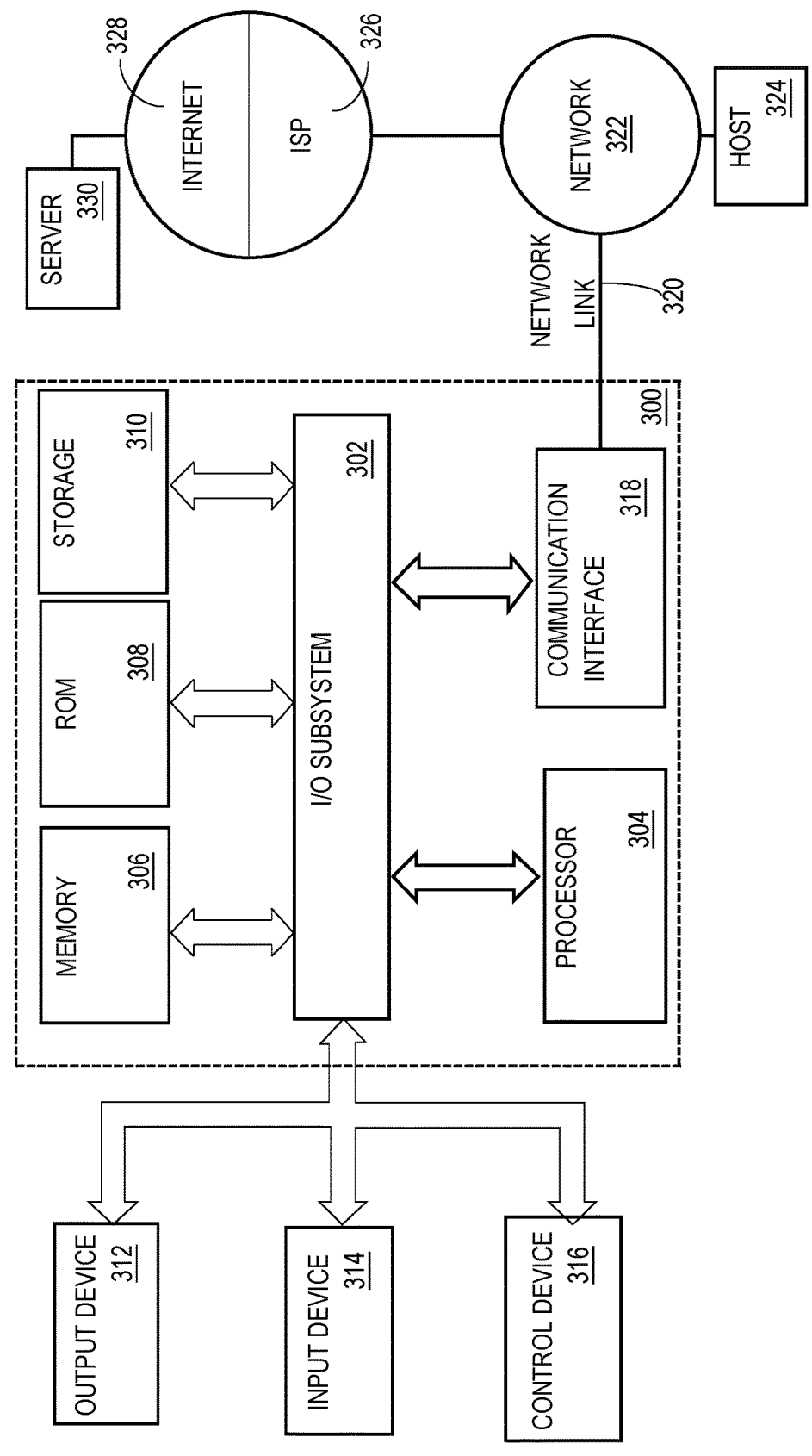
FIG. 3 illustrates a computer system upon which an embodiment may be implemented.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 304 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as instructions, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL), no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 200 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

5. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented data processing method comprising:
  receiving, from a second computing device at a first computing device that is communicatively coupled to the second computing device, a request to store a first entity data object, the first entity data object including a first property key-value pair, a second property key-value pair, and entity data;

creating and storing, in one or more digital data repositories, a multi-column table comprising an array type column that is structured as a variable length array;

storing the first property key-value pair and the second property key-value pair as separate elements of an array in the array type column of the multi-column table in the one or more digital data repositories in response to the request;

storing the entity data of the first entity data object in one or more columns other than the array type column of the multi-column table in the one or more digital data repositories in response to the request;

receiving, from the second computing device at the first computing device, a delete command that specifies the first property key-value pair to delete by;

in response to the delete command that specifies the first property key-value pair to delete by, deleting the first entity data object including the first property key-value pair, the second property key-value pair, and the entity data in the one or more digital data repositories.

2. The method of claim 1, wherein the first computing device comprises a first collaboration platform and wherein the second computing device comprises a second collaboration platform;
wherein the first collaboration platform comprises an issue tracking system and wherein the second collaboration platform comprises a code repository system.

3. The method of claim 1, wherein storing the first entity data object includes:
generating a first hash value for the first property key-value pair of the first entity data object;
storing the first hash value for the first property key-value pair in the one or more digital data repositories in place of the first property key-value pair.

4. The method of claim 3, further comprising:
receiving, from the second computing device at the first computing device, a query including a select command that specifies a particular property key-value pair to select by;
generating a particular hash value for the particular property key-value pair included in the query;
in response to determining that the particular hash value matches the first hash value, generating a result set of the query that includes data from the first entity data object;
transmitting the result set of the query to the second computing device.

5. The method of claim 1, further comprising:
receiving, from a third computing device at the first computing device communicatively coupled to the first computing device, a request to store a second entity data object, the second entity data object including a third property key-value pair;
using the first computing device, storing the second entity data object in the one or more digital data repositories in response to the request.

6. The method of claim 5, wherein the first property key-value pair represents a first account management grouping of a first collaboration platform and wherein the third property key-value pair represents a second account management grouping of a second collaboration platform that is distinct from the first account management grouping.

7. The method of claim 1, wherein the delete command comprises a Structured Query Language (SQL) delete command.

8. A computer-implemented data processing method comprising:
creating and storing, in one or more digital data storage repositories, a multi-column table comprising an array type column that is structured as a variable length array;
receiving, from a plurality of different computing devices, each of the different computing devices being associated with a different entity data object among multiple entity data objects, multiple sets of digital key-value pairs of properties of different entity data objects, each of the multiple entity data objects comprising at least one set of digital key-value pairs and entity data, each of the sets comprising at least a first property key-value pair and a second property key-value pair;
for a particular entity data object of the multiple entity data objects that includes a particular set of digital key-value pairs of properties, storing the first property key-value pair and second property key-value pair as separate elements of an array in the array type column of the multi-column table and storing the entity data in one or more columns other than the array type column of the multi-column table;
receiving a delete command that specifies the first property key-value pair of the particular set of digital key-value pairs of properties to delete by;
in response to the delete command, deleting the particular entity data object of the multiple entity data objects that is associated with the first property key-value pair of the particular set of digital key-value pairs of properties in the one or more digital data repositories.

9. The method of claim 8, wherein storing the first property key-value pair and second property key-value pair for the particular set of digital key-value pairs of properties includes:
generating a first hash value for the first property key-value pair of the particular set of digital key-value pairs of properties;
generating a second hash value for the second property key-value pair of the particular set of digital key-value pairs of properties;
storing the first hash value in the one or more digital data repositories in place of the first property key-value pair of the particular set of digital key-value pairs of properties;
storing the second hash value in the one or more digital data repositories in place of the second property key-value pair of the particular set of digital key-value pairs of properties.

10. The method of claim 9, further comprising:
receiving, from a particular computing device of the plurality of different computing devices, a query including a select command that specifies a particular property key-value pair to select by;
generating a particular hash value for the particular property key-value pair included in the query;
in response to determining that the particular hash value matches the first hash value, generating a result set of the query that includes data from a data object associated with the first property key-value pair of the particular set of digital key-value pairs of properties;
transmitting the result set of the query to the particular computing device.

11. A computer system comprising:
a first computing device and a second computing device, the first computing device comprising: a networking interface that is communicatively coupled to the second computing device and one or more digital data repositories; one or more non-transitory computer-readable storage media storing one or more sequences of instructions which when executed cause the first computing device to perform:

receiving, from the second computing device, a request to store a first entity data object, the first entity data object including a first property key-value pair, a second property key-value pair, and entity data;

creating and storing, in the one or more digital data repositories, a multi-column table comprising an array type column that is structured as a variable length array;

storing the first property key-value pair and the second property key-value pair as separate elements of an array in the array type column of the multi-column table in the one or more digital data repositories in response to the request;

receiving, from the second computing device, a delete command that specifies the first property key-value pair to delete by;

in response to the delete command that specifies the first property key-value pair to delete by, deleting the first entity data object including the first property key-value pair, the second property key-value pair, and the entity data in the one or more digital data repositories.

12. The system of claim 11, wherein the first computing device comprises a first collaboration platform and wherein the second computing device comprises a second collaboration platform;

wherein the first collaboration platform comprises an issue tracking system and wherein the second collaboration platform comprises a code repository system.

13. The system of claim 11, wherein storing the first entity data object includes:

generating a first hash value for the first property key-value pair of the first entity data object;

storing the first hash value for the first property key-value pair in the one or more digital data repositories in place of the first property key-value pair.

14. The system of claim 13, further comprising:

receiving, from the second computing device, a query including a select command that specifies the first property key-value pair to select by;

generating a second hash value for the first property key-value pair included in the query;

in response to determining that the second hash value matches the first hash value, generating a result set of the query that includes data from the first entity data object;

transmitting the result set of the query to the second computing device.

15. The system of claim 11, further comprising:

a third computing device, wherein the networking interface is communicatively coupled to the third computing device; further comprising instructions which, when executed by the first computing device, cause:

receiving, from the third computing device, a request to store a second entity data object, the second entity data object including a third property key-value pair;

storing the second entity data object in the one or more digital data repositories in response to the request.

16. The system of claim 15, wherein the first property key-value pair represents a first account management grouping of a first collaboration platform and wherein the third property key-value pair represents a second account management grouping of a second collaboration platform that is distinct from the first account management grouping.

17. The system of claim 11, wherein the delete command comprises a Structured Query Language (SQL) delete command.

* * * * *